United States Patent
Kim

(10) Patent No.: US 7,943,722 B2
(45) Date of Patent: May 17, 2011

(54) FIRE-RETARDANT POLYARYLATE RESIN CONTAINING DIHYDROXYPHENYLACETYLENE AND COMPOSITIONS THEREOF

(75) Inventor: Kyoung Mahn Kim, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 12/641,794

(22) Filed: Dec. 18, 2009

(65) Prior Publication Data

US 2010/0298478 A1    Nov. 25, 2010

(30) Foreign Application Priority Data

May 21, 2009    (KR) .................. 10-2009-0044711

(51) Int. Cl.
*C08G 64/00* (2006.01)
*C08G 63/02* (2006.01)
(52) U.S. Cl. ......... 528/196; 524/343; 526/285; 528/198
(58) Field of Classification Search .................. 524/343; 526/285; 528/196, 198
See application file for complete search history.

(56) References Cited

OTHER PUBLICATIONS

Ellzey, Kenneth A. et al.: "Deoxybenzoin-Based Polyarylates as Halogen-Free Fire-Resistant Polymers", *Macromolecules*, 2006, 39, pp. 3553-3558.
Walters, Richard N. et al.: "Molar Group Contributions to Polymer Flammability", *Journal of Applied Polymer Science*, vol. 87, 2003, pp. 548-563.

*Primary Examiner* — Terressa M Boykin
(74) *Attorney, Agent, or Firm* — Frommer Lawrence & Haug LLP; Ronald R. Santucci

(57) ABSTRACT

Provided is a flame-retardant polyarylate resin and a composition thereof, and more particularly, a polyarylate resin prepared by co-polymerizing 4,4'-dihydroxyphenylacetylene (DHPA), phthaloyl chloride (PC) and bishydroxyphenol (BHP) and a composition of the polyarylate resin. The polyarylate resin has lower heat release capacity than a conventional resin or a resin containing a halogen-based flame-retardant, is environmentally friendly, does not produce toxic materials, and has more excellent flame-retardancy than a conventional halogen-based flame-retardant and a flame-retardant resin. In addition, the polyarylate resin has excellent processibility and compatibility due to high solubility in a commonly used industrial solvent and has excellent thermal stability due to a high molecular weight.

17 Claims, 2 Drawing Sheets

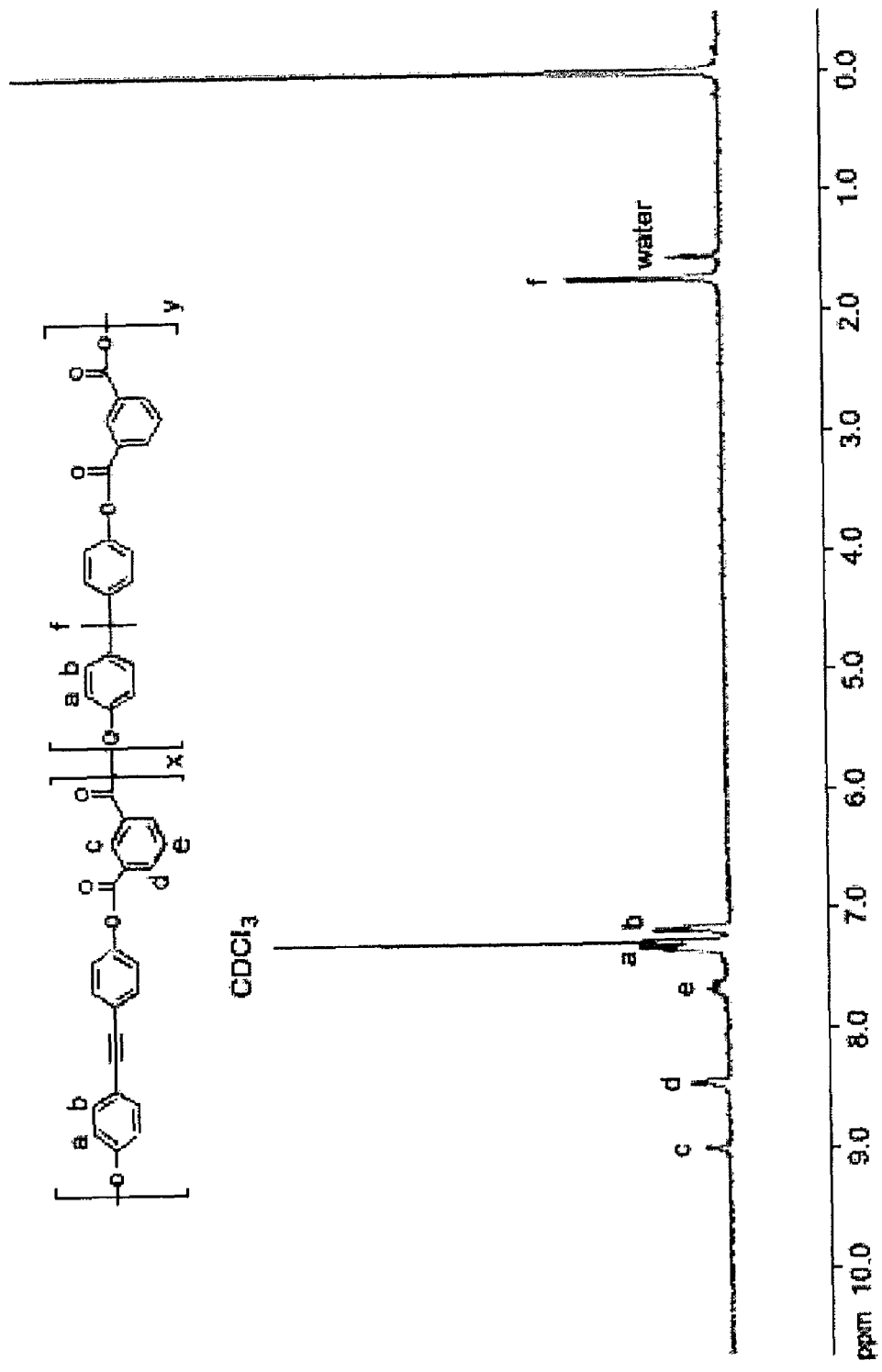
[Fig. 1]

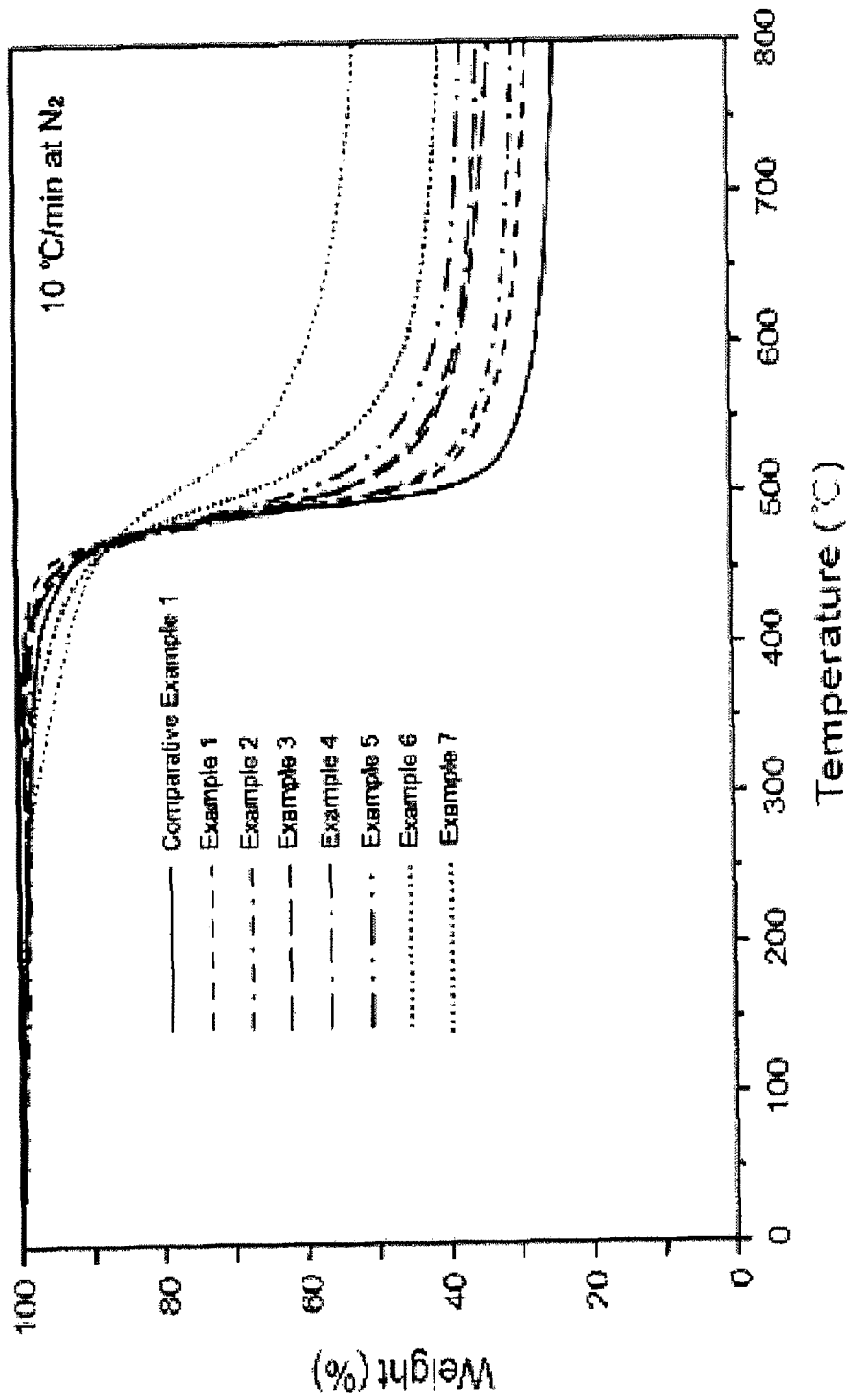
[Fig. 2]

FIRE-RETARDANT POLYARYLATE RESIN CONTAINING DIHYDROXYPHENYLACETYLENE AND COMPOSITIONS THEREOF

CROSS-REFERENCE(S) TO RELATED APPLICATIONS

This application claims under 35 U.S.C. §119(a) the benefit of Korean Patent Application No. 10-2009-0044711 filed May 21, 2009, the entire contents of which are incorporated herein by reference.

BACKGROUND OF THE INVENTION

1. Field of the Invention

The present invention relates to a non-halogen-based polyarylate resin having excellent flame-retardancy and ecofriendliness compared to conventional resins or resins containing a halogen-based flame-retardant.

2. Description of the Related Art

Synthetic polymers have been widely used in various fields, for example, for manufacture of plastics, rubbers, fibers, etc. Since most polymer resins have high flammability, attempts have been made to improve the flame-retardancy of the polymer resins. Flame-retardant resins have been prepared by adding small-sized flame-retardant molecules to a polymer resin or by taking a part of polymer backbone with flame-retardant molecules. Halogenated molecules such as brominated aromatic compounds have been used to improve flame-retardancy of polymers. Brominated aromatic flame-retardants have been used to manufacture a variety of plastic products such as computers, fibers, furniture, and construction materials. However, toxic materials such as dioxin generated by the use of halogenated flame-retardants have been accumulated in our environments, and thus the use of halogenated flame-retardants has been restricted, and there is a need to develop non-halogen-based flame-retardants. Furthermore, since halogenated flame-retardants generate hydrogen chloride gas or hydrobromic acid gas while burning, the use of the halogenated flame-retardants are not suitable for airtight space such as planes and ships. In addition, a large amount of an inorganic non-halogen-based additive such as aluminum hydroxide is required to obtain sufficient flame-retardancy which makes it difficult to maintain mechanical properties of a polymer.

An ideal flame-retardant resin is a non-halogen-based resin that has high thermal stability, low combustion heat and low heat release rate (HRR), and does not release toxic gas. Polymers having low flammability generally produce a large amount of char by heat to form a fireproof layer on the surface of the polymers so that the polymers are inhibited from burning since flammable gas generated by the heat is blocked. The char can be formed by mixing an char providing additives such as composite materials.

The HRR of the material is an intrinsic property indicating flammability of a polymer. The HRR can be measured using various calorie measuring methods. Recently, a pyrolysis combustion flow calorimetry (PCFC) has been developed to measure HRR using a small amount of a sample. The PCFC measures heat release capacity and a total heat release capacity of the polymer. The heat release capacity depends on oxygen consumption and determined by heating rate. The heat release capacity that is defined as a maximum calorie produced by a unit weight is an intrinsic property of a material and known as a major index to predict flammability (See, Richard N. Walters, Richard E. Lyon, *Journal of Applied Polymer Science*, 87(3), 548-563, 2002).

Although an aromatic polyarylate prepared by bisphenol-A and phthalic acid is well known as a high functional engineering plastic and widely used, the heat release capacity (HRC) of the aromatic polyarylate is 359 J/gK indicating high flammability. An aromatic polyarylate containing 1,1-dichloro-2,2-bis(4-hydroxyphenyl)ethylene (BPC) that is known as a self-extinguishing polymer is transparent and has excellent mechanical properties and high flame-retardancy with a heat release capacity (HRC) of 21 and 29 J/gK and 50 to 55% char forming capability (*Macromolecules*, 39(10), 3553-3558, 2006). However, since BPC-containing polyarylate resins emit hydrogen chloride gas at high temperature, they have limitation for mass-production or for industrial products.

Recently, it has been reported that aromatic polyarylate resins containing 4,4'-bishydroxydeoxybenzoin (BHDB) showed low HRR. It has been reported that the BHDB, like BPC, is aromatized by heat to form char (*Macromolecules*, 39(10), 3553-3558, 2006). Even though BHDB-containing polyarylate resins have low HRR of 100 J/g-K or less measured by pyrolysis combustion flow calorimetry this is not satisfactory enough.

Thus, there is a need for the development of a polyarylate resin that has excellent flame-retardancy and is safe from environmental aspect.

SUMMARY OF THE INVENTION

While searching for a method of overcoming problems of conventional flame-retardant resins, the inventors of the present invention have found that polyarylate resins containing 4,4'-dihydroxyphenylacetylene (DHPA) forms large amount of char and has lower heat release capacity (HRC) than conventional resins, and also found an optimal composition ratio of the polyarylate resins containing DHPA. That is, the present invention provides polyarylate resins having excellent flame-retardancy and a composition thereof.

According to an aspect of the present invention, there is provided a non-halogen-based flame-retardant polyarylate resin having a repeating unit represented by Formula 1 below.

Formula 1

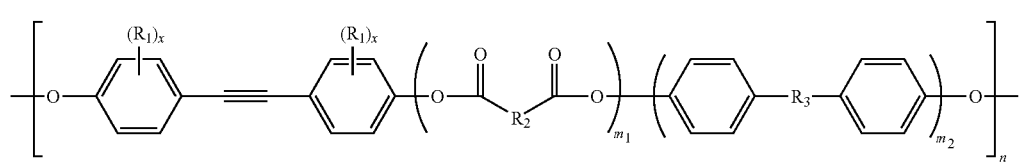

In Formula 1, $R_1$ is a hydrogen atom or a $C_1$-$C_5$ alkyl group, x is an integer from 1 to 4; $R_2$ is a substituted or unsubstituted alkylene group, a substituted or unsubstituted phenylene group, or a substituted or unsubstituted arylene group; $R_3$ is —C(O)—, —CH$_2$—, —C(CH$_3$)$_2$— or —S(O)$_2$—; $m_1$ and $m_2$ are integers respectively satisfying $1 \leq m_1 \leq 100$ and $0 \leq m_2 \leq 100$; and n is an integer satisfying $1 \leq n \leq 100$; wherein a substituent of the substituted alkylene group, the substituted phenylene group and the substituted arylene group of $R_2$ is a saturated alkyl group, an unsaturated alkyl group, a phenyl group, an alkoxy group, a phenoxy group, an aryl group, a carboxyl group, a nitro group, an amino group, an amino group substituted with an alkyl group, a sulfonyl group or a sulfamoyl group.

According to another aspect of the present invention, there is provided a composition of a flame-retardant polyarylate resins, the composition including:

a 4,4'-dihydroxyphenylacetylene compound represented by Formula 2 below, a phthaloyl chloride compound represented by Formula 3 below, and a bis(hydroxyphenyl) (BHP) compound represented by Formula 4 below.

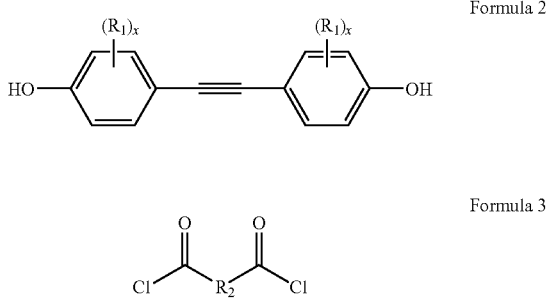

Formula 2

Formula 3

In Formula 3, $R_2$ is a substituted or unsubstituted alkylene group, a substituted or unsubstituted phenylene group, or a substituted or unsubstituted arylene group, wherein a substituent of the substituted alkylene group, the substituted phenylene group and the substituted arylene group is a saturated alkyl group, an unsaturated alkyl group, a phenyl group, an alkoxy group, a phenoxy group, an aryl group, a carboxyl group, a nitro group, an amino group, an amino group substituted with an alkyl group, a sulfonyl group or a sulfamoyl group.

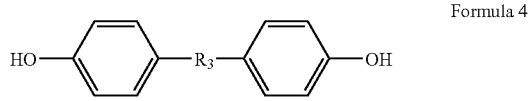

Formula 4

In Formula 4, $R_3$ is —C(O)—, —CH$_2$—, —C(CH$_3$)$_2$— or —S(O)$_2$—.

EFFECTS OF THE INVENTION

The polyarylate resin according to the present invention is an environmentally safe material without halogens, has high heat-resistance, produces a large amount of carbonized char yield on the surface of the polyarylate resin, and has low heat release capacity, thereby having excellent flame-retardancy. In addition, the polyarylate resin has excellent processibility due to high solubility in a commonly used industrial solvent and has excellent thermal stability due to a high molecular weight. Thus, the polyarylate resin is expected to provide efficient mechanical properties from commercial point of view.

BRIEF DESCRIPTION OF THE DRAWINGS

The above and other features and advantages of the present invention will become more apparent by describing in detail exemplary embodiments thereof with reference to the attached drawings in which:

FIG. 1 shows $^1$H-NMR spectra of a polyarylate resin synthesized in Example 1; and FIG. 2 shows results of thermal stability tests performed in experimental examples.

DETAILED DESCRIPTION OF THE INVENTION

Hereinafter, the present invention will now be described more fully with reference to the accompanying drawings, in which exemplary embodiments of the invention are shown.

One or more embodiments of the present invention include a non-halogen-based polyarylate resin having a repeating unit represented by Formula 1 below and excellent flame-retardancy, and examples of the non-halogen-based polyarylate resin are Formulae 1a, 1b, and 1c.

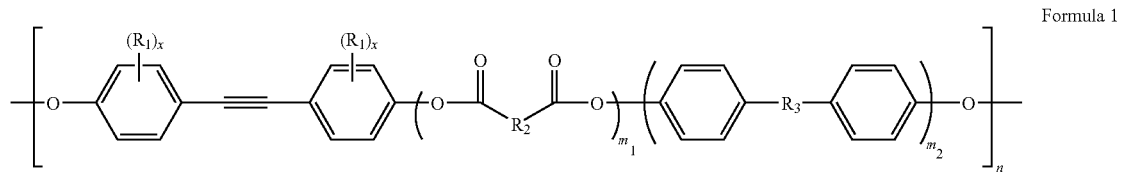

Formula 1

In Formula 1, $R_1$ is a hydrogen atom or a $C_1$-$C_5$ alkyl group, x is an integer from 1 to 4; $R_2$ is a substituted or unsubstituted alkylene group, a substituted or unsubstituted phenylene group, or a substituted or unsubstituted arylene group; $R_3$ is —C(O)—, —CH$_2$—, —C(CH$_3$)$_2$— or —S(O)$_2$—; $m_1$ and $m_2$ are integers respectively satisfying $1 \leq m_1 \leq 100$ and $0 \leq m_2 \leq 100$; and n is an integer satisfying $1 \leq n \leq 100$; wherein a substituent of the substituted alkylene group, the substituted phenylene group and the substituted arylene group of $R_2$ is a saturated alkyl group, an unsaturated alkyl group, a phenyl group, an alkoxy group, a phenoxy group, an aryl group, a carboxyl group, a nitro group, an amino group, an amino group substituted with an alkyl group, a sulfonyl group or a sulfamoyl group.

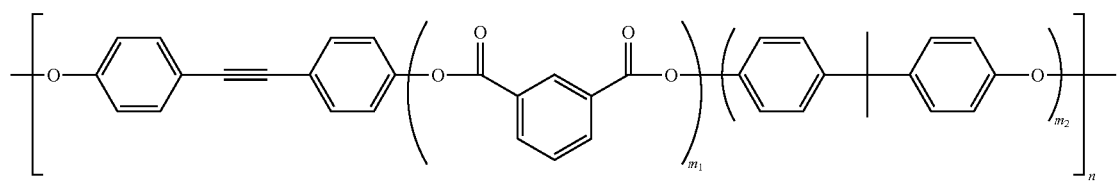

Formula 1a

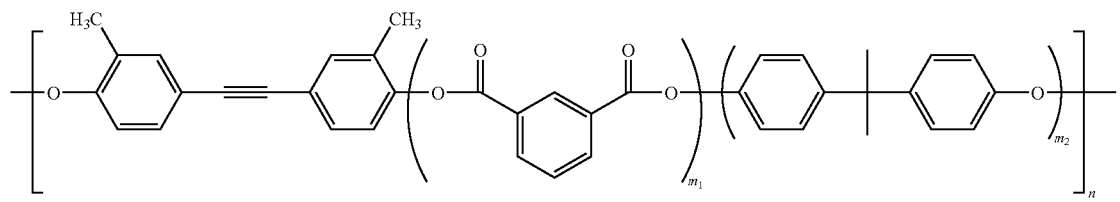

Formula 1b

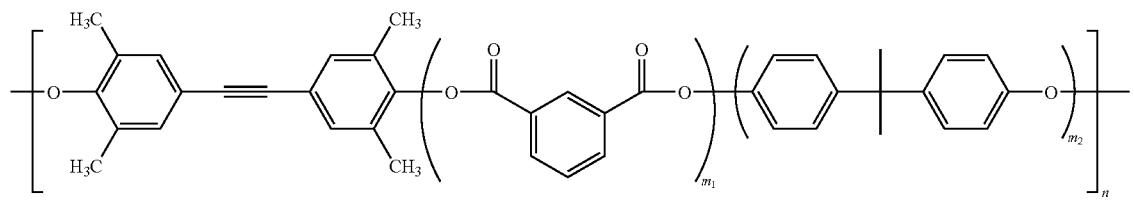

Formula 1c

The polyarylate resin has a weight average molecular weight (Mw) of equal to or greater than 10,000, and a char yield of equal to or greater than 25% (at 800° C.).

The polyarylate resin may be prepared by polymerizing compounds represented by Formulae 2 to 4 as shown in Reaction Scheme 1 below. The polyarylate resin is a copolymer, for example, a random copolymer, a block copolymer thereof.

Reaction Scheme 1

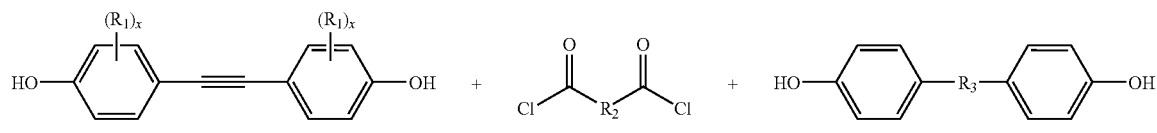

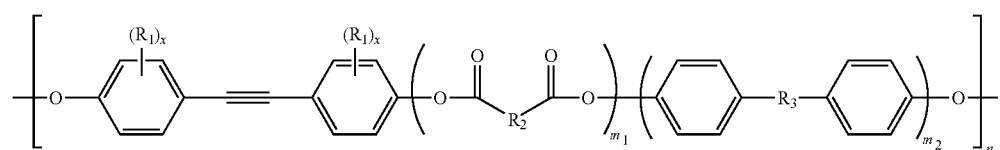

Formula 1

In Reaction Scheme 1, $R_1$, $R_2$, $R_3$, x, $m_1$, $m_2$, and n are the same as those described with reference to Formula 1.

One or more embodiments of the present invention include a composition of a flame-retardant polyarylate resin, the composition including: a 4,4'-dihydroxyphenylacetylene compound represented by Formula 2 below, a phthaloyl chloride compound represented by Formula 3 below, and a bishydroxyphenol (BHP) compound represented by Formula 4 below.

Formula 2

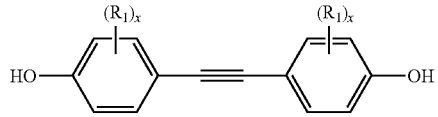

In Formula 2, $R_1$ is a hydrogen atom or a $C_1$-$C_5$ alkyl group, and x is an integer from 1 to 4.

Formula 3

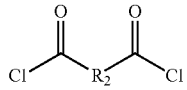

In Formula 3, $R_2$ is a substituted or unsubstituted alkylene group, a substituted or unsubstituted phenylene group, or a substituted or unsubstituted arylene group, wherein a substituent of the substituted alkylene group, the substituted phenylene group and the substituted arylene group is a saturated alkyl group, an unsaturated alkyl group, a phenyl group, an alkoxy group, a phenoxy group, an aryl group, a carboxyl group, a nitro group, an amino group, an amino group substituted with an alkyl group, a sulfonyl group or a sulfamoyl group.

Formula 4

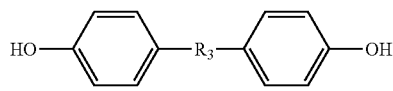

In Formula 4, $R_3$ is —C(O)—, —CH$_2$—, —C(CH$_3$)$_2$— or —S(O)$_2$—.

The 4,4'-dihydroxyphenylacetylene (DHPA) compound represented by Formula 2 is a compound providing flame-retardancy to the polyarylate resin according to the present embodiment and may be synthesized through Reaction Scheme 2 below.

Reaction Scheme 2

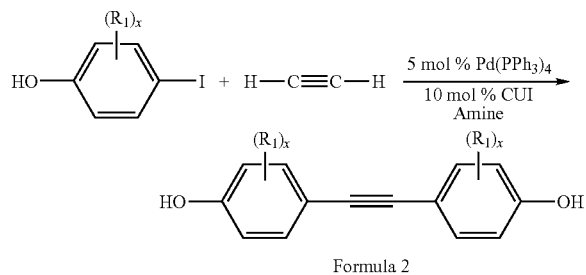

In Reaction Scheme 2, $R_1$ and x are the same as those described with reference to Formula 2. Examples of the DHPA compound of Formula 2 are Formulae 2-a, 2-b and 2-c below. In order to improve solubility to a conventional industrial solvent to increase processibility, compounds having at least two methyl groups as shown in Formulae 2-b and 2-c may be used.

Formula 2-a

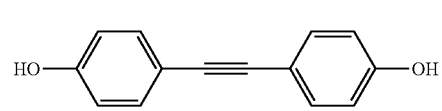

Formula 2-b

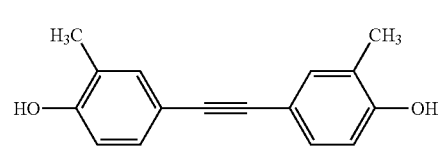

Formula 2-c

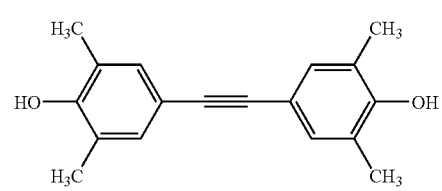

In the phthaloyl chloride (PC) compound represented by Formula 3, $R_2$ may be a substituted or unsubstituted alkylene group, a substituted or unsubstituted phenylene group, or a substituted or unsubstituted arylene group. A substituent of the substituted alkylene group, the substituted phenylene group and the substituted arylene group may be a saturated alkyl group, an unsaturated alkyl group, a phenyl group, an alkoxy group, a phenoxy group, an aryl group, a carboxyl group, a nitro group, an amino group, an amino group substituted with an alkyl group, a sulfonyl group or a sulfamoyl group. In addition, the phthaloyl chloride compound may be a terephthaloyl chloride represented by Formula 3-a or isophthaloyl chloride represented by Formula 3-b in which $R_2$ is an unsubstituted phenyl group.

Formula 3-a

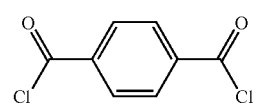

Formula 3-b

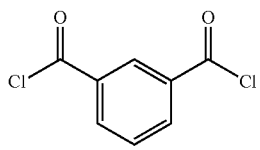

The bishydroxyphenol compound represented by Formula 4 is a compound constituting an aromatic polyester with the compound of Formula 3, and may include at least one bishydroxyphenol (BHP) selected from the group consisting of compounds represented by Formulae 4-a, 4-b, 4-c and 4-d below. However, the bishydroxyphenol compound may be selected according to desired physical properties, and is preferably bisphenol-A (BPA) represented by Formula 4-a.

Formula 4-a

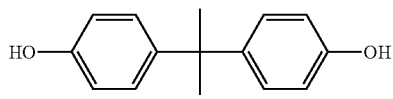

Formula 4-b

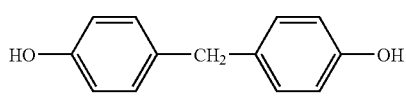

Formula 4-c

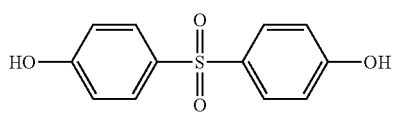

Formula 4-d

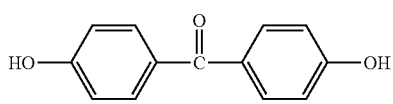

In addition, in the composition of the polyarylate resin, the molar ratio of the DHPA compound represented by Formula 2: the BHP compound represented by Formula 4 may be in the range of 5 to 95:95 to 5, preferably 10 to 90:90 to 10, and more preferably 20 to 70:80 to 30. In this regard, if the molar ratio of the DHPA compound:the BHP compound is not within the range of 5 to 95:95 to 5, the amount of the DHPA compound contained in the polyarylate resin is too small, so that too small amount of char is formed, and thus flame-retardancy may be reduced and compatibility may decrease. On the other hand, if the amount of the DHPA compound is too large, solubility of the polyarylate resin in the organic solvent may decrease, so that it is difficult to choose the organic solvent. Thus, the molar ratio of the DHPA compound:the BHP compound may be within the range described above.

Specifically, the composition may have excellent solubility and thermal properties if the molar ratio of the DHPA compound:the PC compound:the BHP compound is in the range of 1 to 9:10:9 to 1, and preferably 2 to 8:10:8 to 2. The polyarylate resin and the composition of the polyarylate resin may be used alone. In addition, the polyarylate resin and the composition of the polyarylate resin may be dissolved in at least one organic solvent selected from the group consisting of N-methylpyrrolidone (NMP), m-cresol, chloroform, tetrahydrofuran (THF), dimethyl sulfoxide (DMSO) and dimethylformamide (DMF) to improve processibility and compatibility. The polyarylate resin according to the present embodiment has excellent solubility in the organic solvent. In addition, a composite material prepared by dissolving the polyarylate resin and other plastic material in the organic solvent may be used as flame-retardant materials for fibers, construction materials, furniture, etc.

Hereinafter, one or more embodiments will be described in detail with reference to the following examples. However, these examples are not intended to limit the purpose and scope of the invention.

SYNTHESIS EXAMPLE

Example 1

Synthesis of 4,4'-dihydroxyphenylacetylene (DHPA)

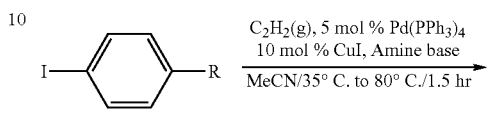

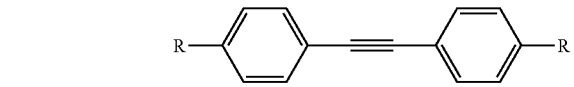

4,4'-dihydroxyphenylacetylene was prepared using 4-iodophenol, acetylene gas and a palladium catalyst (See, Chaojun Li, Dong-Li Chen, Christopher W Castello, Organic Process Research & Development 1997, 1, 325-327).

8.8 g (40 mmol) of 4-iodophenol, 0.76 g (10 mol %) of CuI, and 2.3 g (5 mol %) of Pd(Ph$_3$)$_4$ were added to 120 ml of acetonitrile. While the mixture was stirred, 40 ml of piperidine was added thereto, and then the inside of the reactive system was replaced by acetylene gas and gradually heated to 75° C.

Then, the reaction was monitored using thin layer chromatography. When the reaction was terminated, the resultant was cooled to room temperature, solid was removed by filtration, and the resultant was neutralized using 2N HCl. The product was subjected to extraction using ethyl acetate, and an organic layer was washed with water and salt water. Then, moisture of the organic layer was removed using anhydrous magnesium sulfate, and the solvent was removed under a reduced pressure to obtain 3.5 g of 4,4'-dihydroxyphenylacetylene. The structure was identified using $^1$H NMR and $^{13}$C NMR.

$^1$H NMR (400 MHz, acetone-d$_6$): δ 6.85 (d, 4H, 2phenyl), 7.35 (d, 4H, 2phenyl), 8.70 (s, 2H, 2OH)

$^{13}$C NMR (acetone-d$_6$): δ 88.3, 115.4, 116.3, 133.6, 158.3

Example 2

Synthesis of 3,3"-dimethyl-4,4'-dihydroxyphenylacetylene (DHPAM)

3,3"-dimethyl-4,4'-dihydroxyphenylacetylene was synthesized in the same manner as in Synthesis Example 1, except that 3-methyl-4-iodophenol was used instead of 4-iodophenol. The structure was identified using $^1$H NMR and $^{13}$C NMR.

$^1$H NMR (acetone-d$_6$): δ 2.16 (s, 6H, 2CH$_3$), 6.77 (d, 2H, 2phenyl), 7.11 to 7.12 (dd, 4H, 2phenyl), 9.72 (s, 2H, 2OH)

$^{13}$C NMR (acetone-d$_6$): δ 88.3, 115.4, 116.3, 133.6, 158.3, 206.12

Examples

Preparation of Flame-Retardant Polyarylate Resin

Examples 1 to 9 and Comparative Example 1

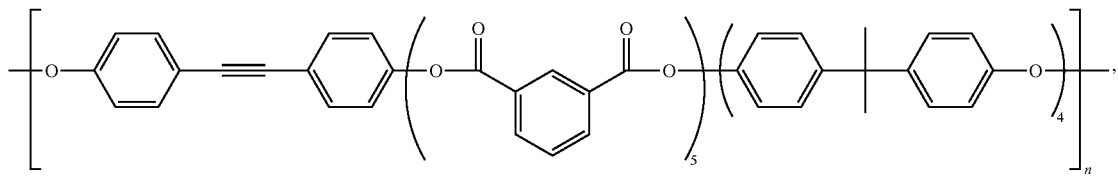

wherein n is an integer satisfying 1≦n≦100.

To a 250 ml 1-neck round flask was added 27 ml of distilled water and 1.66 g (41.4 mmol) of NaOH, followed by addition of 0.41 g (7.88 mmol) of bisphenol-A (BPA) and 0.41 g (1.97 mmol) of 4,4'-dihydroxymethylphenylacetylene (DHPA) to dissolve. After dissolving the solid materials, then, 0.11 g (0.48 mmol) of Et$_3$BzNCl was added thereto, the mixture was stirred until become homogeneous. To the mixture was added 9.85 mmol of isophthaloyl chloride (IPC) dissolved in CH$_2$Cl$_2$ through an additional funnel for 30 minutes with vigorously stirring. After 2 hours, the resultant solution was poured to precipitate in 500 ml of methanol (MeOH) and filtered. Then, the precipitate was washed three times with 50 ml of distilled water and 50 ml of methanol and dried in a vacuum oven at 30° C. for 12 hours to obtain a desired product. Polyarylate resins were synthesized in the same manner as described above, except that the amount of IPC was fixed, and the molar ratio of the DHPA to BPA was varied as shown in Table 1 below. However, polyarylate resins were synthesized in Examples 8 and 9 was used DHPAM in Synthesis Example 2 instead of DHPA.

The synthesized polyarylate resins were analyzed using FT-NMR, FT-IR and GPC. In addition, solubility in an organic solvent, thermal properties, and flame-retardancy of the polyarylate resins were measured using thermogravimetric analysis (TGA), differential scanning calorimetry (DSC) and pyrolysis combustion flow calorimetry (PCFC), and the results are shown in Table 1 below. In addition, FIG. 1 shows $^1$H NMR spectra of the polyarylate resins.

TABLE 1

|  | DHPA:BPA (molar ratio) | | Yield of polyarylate resin (%) | GPC[a] | | |
|---|---|---|---|---|---|---|
|  | Feed | Incorporated[b] |  | Weight average molecular weight (Mw) | Number average molecular weight (Mn) | Dispersibility |
| Example 1 | 5:95 | 7:93 | 74 | 6,154 | 5,260 | 1.17 |
| Example 2 | 10:90 | 9:91 | 81 | 15,987 | 9,930 | 1.61 |
| Example 3 | 20:80 | 21:79 | 78 | 30,734 | 19,090 | 1.61 |
| Example 4 | 30:70 | 29:71 | 77 | 46,426 | 26,650 | 1.61 |
| Example 5 | 40:60 | 38:62 | 83 | 46,846 | 30,030 | 1.56 |
| Example 6 | 50:50 | 51:49 | 57 | 40,025 | 18,880 | 2.12 |
| Example 7 | 100:0 | 100:0 | 60 | 23,284 | 15,840 | 1.47 |
| Example 8 | 10:90 | 12:88 | 88 | 23,805 | 15,870 | 1.75 |
| Example 9 | 20:80 | 21:79 | 85 | 25,549 | 13,170 | 1.94 |
| Comparative Example 1 | 0:100 | 0:100 | 66 | 32,853 | 21,060 | 1.56 |

[a]Molecular weights calculated based on polystyrene measurement standard and results of gel permeation column chromatography of eluent using DMF.
[b]Calculated by integration of $^1$H NMR spectra.

Experimental Example

Physical properties of the polyarylate resins prepared according to Examples 1 to 9 and Comparative Example 1 were measured as follows.

1) Solubility

Polyarylate resins prepared according to Examples 1 to 9 and Comparative Example 1 were respectively dissolved in each of N-methylpyrrolidone (NMP), m-cresol (m-cresol), chloroform ($CHCl_2$), tetrahydrofuran (THF), methyl chloride (MC), ethyl acetate (EA), toluene, methanol (MeOH), hexane and acetone to measure solubility thereof, and the results are shown as Table 2 below.

TABLE 2

|  | NMP | m-cresol | $CHCl_2$ | THF | MC | EA | toluene | methanol | hexane | acetone |
|---|---|---|---|---|---|---|---|---|---|---|
| Example 1 | ++ | ++ | ++ | ++ | ++ | − | − | − | − | − |
| Example 2 | ++ | ++ | ++ | ++ | + | − | − | − | − | − |
| Example 3 | ++ | ++ | ++ | + | + | − | − | − | − | − |
| Example 4 | ++ | ++ | ++ | + | + | − | − | − | − | − |
| Example 5 | ++ | ++ | + | + | + | − | − | − | − | − |
| Example 6 | ++ | + | + | + | + | − | − | − | − | − |
| Example 7 | + | − | − | − | − | − | − | − | − | − |
| Example 8 | ++ | ++ | ++ | ++ | ++ | − | − | − | − | − |
| Example 9 | ++ | ++ | ++ | ++ | ++ | − | − | − | − | − |
| Comparative Example 1 | ++ | ++ | ++ | ++ | ++ | − | − | − | − | − |

++: highly soluble,
+: fairly soluble,
−: insoluble.

Referring to Table 2, the solubility of the polyarylate resins decreases as the amount of DHPA increases. That is, since the solubility of the polyarylate resin decreases as the amount of DHPA increases, the molar ratio of DHPA:PC:BPA is desired (or better) to be in the range of 1 to 9:10:9 to 1.

2) Thermal Properties of Polyarylate Resin and Char Yield

Flammability such as heat release capacity (HRC) of polyarylate resins was measured using 1 to 5 mg of samples in a pyrolysis combustion flow calorimetry (CFC). The samples were thermally degraded at 900° C. at a rate of 1° C./s in a nitrogen atmosphere and completely burned at 900° C. to measure the degradation temperature of the polyarylate resins. In addition, glass transition temperature (Tg) of the polyarylate resins were measured using a differential scanning calorimetry (DSC). Char yields were measured by comparing the weight difference of the polyarylate resins before and after the test.

TABLE 3

|  | Intrinsic viscosity (dl/g) | Glass transition temperature of resin ($T_g$, C.°) | Degradation temperature of resin ($T_d$, C.°) Air | Degradation temperature of resin ($T_d$, C.°) $N_2$ | Char yield (%, at 800 C.°) |
|---|---|---|---|---|---|
| Example 1 | 0.57 | 172 | 450 | 460 | 29.60 |
| Example 2 | 0.85 | 183 | 427 | 450 | 30.05 |
| Example 3 | 1.03 | 190 | 435 | 446 | 33.23 |
| Example 4 | 1.35 | 196 | 442 | 443 | 35.00 |
| Example 5 | 1.42 | 203 | 434 | 438 | 37.08 |
| Example 6 | 1.17 | 215 | 398 | 407 | 40.34 |
| Example 7 | 0.97 | 256 | 351 | 360 | 52.08 |
| Example 8 | 1.05 | 154 | 434 | 431 | 29.28 |
| Example 9 | 1.05 | 159 | 432 | 429 | 32.81 |
| Comparative Example 1 | 1.19 | 157 | 441 | 435 | 25.36 |

The glass transition temperature (Tg) of the polyarylate resins prepared in Examples 1 to 9 according to the present invention is in the range of 186 to 256° C., which is greater than that of the polyarylate resin prepared according to Comparative Example 1. As the amount of DHPA increases, rigidity of a polymer chain increases. Therefore, the polyarylate resin with a large amount of DHPA can be used for a high performance engineering plastic with high flame-retardancy. In addition, the polyarylate resin according to the present invention is not melted or crystallized up to 300° C.

The char yields are equal to or greater than 30% at 800° C. The char yields of the polyarylate resins obtained according to Examples 1 to 9 were greater than that obtained according to Comparative Example 1. Thus, in the polyarylate resins according to the present invention, the molar ratio of DHPA:PC:BPA may can be in the range of 1 to 9:10:9 to 1.

3) Thermal Stability

Thermal stability of the polyarylate resins prepared according to Examples 1 to 9 and Comparative Example 1 was measured using thermogravimetric analysis (TGA), and the results are shown in FIG. 2.

Referring to FIG. 2, the polyarylate resins prepared in Examples 1 to 9 according to the present invention are stable up to 400 to 460° C. In this temperature range, a weight reduction rate by thermogravimetric analysis (TGA) is less than 5%.

As the amount of DHPA increases, thermal stability of the polyarylate resins decreases, but carbonization degree (char yield) increases, which showed the increase in flame-retardancy indirectly.

4) Flame-Retardancy

In order to measure flame-retardancy of the polyarylate resins, heat release capacities of the polyarylate resins were measured using a pyrolysis combustion flow calorimetry (PCFC), and the results are shown in Table 4 below.

TABLE 4

|  | Heat release capacity {J/(g − K)} | Total heat release capacity (kJ/g) | Char yield (%) PCFC[a] | Char yield (%) TGA[b] |
|---|---|---|---|---|
| Example 1 | 353 | 15.0 | 25.7 | 29.6 |
| Example 2 | 335 | 14.8 | 25.8 | 30.0 |
| Example 3 | 231 | 12.5 | 29.1 | 33.2 |
| Example 4 | 213 | 11.4 | 31.6 | 35.0 |
| Example 5 | 175 | 10.3 | 37.3 | 37.0 |
| Example 6 | 119 | 7.8 | 47.3 | 40.3 |
| Example 7 | 33 | 3.3 | 58.2 | 52.0 |
| Example 8 | 280 | 15.1 | 28.6 | 29.28 |
| Example 9 | 211 | 13.5 | 33.0 | 32.81 |

TABLE 4-continued

| | Heat release capacity {J/(g − K)} | Total heat release capacity (kJ/g) | Char yield (%) | |
| --- | --- | --- | --- | --- |
| | | | PCFC[a] | TGA[b] |
| Comparative Example 1 | 356 | 16.2 | 24.0 | 24.1 |

[a]Heat release capacity (HRC)
[b]Pyrolysis combustion flow calorimetry (PCFC)
[c]Thermogravimetric analysis (TGA)

The heat release capacity of the polyarylate resins prepared in Examples 1 to 9 according to the present invention is less than that of the polyarylate resin prepared according to Comparative Example 1. Accordingly, it can be identified that the polyarylate resins according to the present invention have excellent flame-retardancy. In addition, if the molar ratio of DHPA:PC:BPA is 5:10:5 as in Example 6, the heat release capacity is less than 120 J/g-K, which is greater than that of polyvinylidene fluoride (311 J/g-K), polyphenylene sulfide (165 J/g-K), polyetheretherketone (155 J/g-K), polyphenylsulfone (153 J/g-K), and polyetherimide (121 J/g-K) which are known to have self-extinguishing properties.

The polyarylate resin prepared in Example 7 has a very low heat release capacity of about 33 J/gK and a high char yield of 52%, and thus it can be seen that flame-retardancy thereof is significantly increased.

INDUSTRIAL APPLICABILITY

The polyarylate resin having excellent flame-retardancy and the composition there of according to the present invention may be mixed with a thermoplastic resin or a thermosetting resin to be used for a plastic material having excellent flame-retardancy. Since the polyarylate resin according to the present invention may reduce corrosion of plastic caused by halogen and the number of casualties caused by toxic gas when fire occurs, safety of various electric appliances and industrial products including the polyarylate resin for human is improved, halogen free flame-retardant resin may be reused, and environment may be stably maintained. Thus, the polyarylate resin according to the present invention may be widely used as a flame-retardant material for plastic used in various industrial fields of electrical and electronic engineering, construction, furniture, fibers, automobiles, aerospace, robots, or the like.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A flame-retardant polyarylate resin having a repeating unit represented by Formula 1 below:

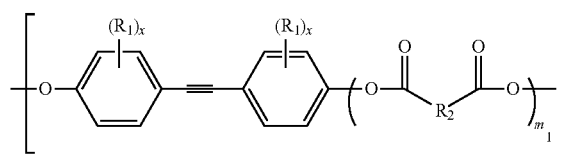

Formula 1

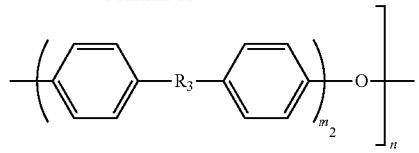

wherein $R_1$ is a hydrogen atom or a $C_1$-$C_5$ alkyl group, x is an integer from 1 to 4; $R_2$ is a substituted or unsubstituted alkylene group, a substituted or unsubstituted phenylene group, or a substituted or unsubstituted arylene group; $R_3$ is —C(O)—, —CH$_2$—, —C(CH$_3$)$_2$— or —S(O)$_2$—; $m_1$ and $m_2$ are integers respectively satisfying $1 \leq m_1 \leq 100$ and $0 \leq m_2 \leq 100$; and n is an integer satisfying $1 \leq n \leq 100$; wherein a substituent of the substituted alkylene group, the substituted phenylene group and the substituted arylene group of $R_2$ is a saturated alkyl group, an unsaturated alkyl group, a phenyl group, an alkoxy group, a phenoxy group, an aryl group, a carboxyl group, a nitro group, an amino group, an amino group substituted with an alkyl group, a sulfonyl group or a sulfamoyl group.

2. The flame-retardant polyarylate resin of claim 1, wherein $R_1$ is a hydrogen atom or a methyl group, $R_2$ is

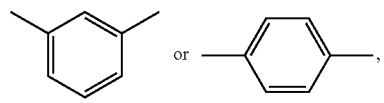

and $R_3$ is —CH$_2$— or —C(CH$_3$)$_2$—.

3. The flame-retardant polyarylate resin of claim 1, wherein $m_2$ is 0.

4. A composition of a flame-retardant polyarylate resin, the composition comprising:
a 4,4'-dihydroxyphenylacetylene compound represented by Formula 2 below, a phthaloyl chloride compound represented by Formula 3 below, and a bishydroxyphenol compound represented by Formula 4 below:

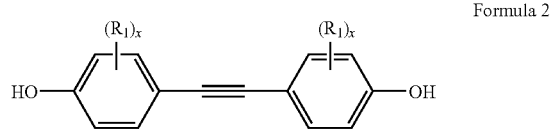

Formula 2 wherein $R_1$ is a hydrogen atom or a $C_1$-$C_5$ alkyl group, and x is an integer from 1 to 4;

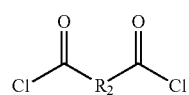

Formula 3 wherein $R_2$ is a substituted or unsubstituted alkylene group, a substituted or unsubstituted phenylene group, or a substituted or unsubstituted arylene group, wherein a substituent of the substituted alkylene group, the substituted phenylene group and the substituted arylene group is a saturated alkyl group, an unsaturated alkyl group, a phenyl group, an alkoxy group, a phenoxy group, an aryl group, a carboxyl group, a nitro group, an amino group, an amino group substituted with an alkyl group, a sulfonyl group or a sulfamoyl group;

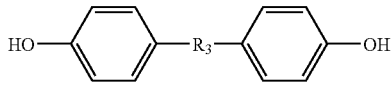

Formula 4 wherein $R_3$ is —C(O)—, —CH$_2$—, —C(CH$_3$)$_2$— or —S(O)$_2$—.

5. The composition of claim 1, wherein $R_1$ is a hydrogen atom or a methyl group, $R_2$ is

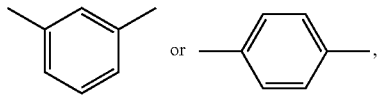

and $R_3$ is —CH$_2$— or —C(CH$_3$)$_2$—.

6. The composition of claim 4, wherein the molar ratio of the 4,4'-dihydroxyphenylacetylene compound represented by Formula 2: bishydroxyphenol compound represented by Formula 4 is in the range of 5 to 95:95 to 5.

7. The composition of claim 4, wherein the molar ratio of the 4,4'-dihydroxyphenylacetylene compound represented by Formula 2: the phthaloyl chloride compound represented by Formula 3: bis(hydroxyphenyl) compound represented by Formula 4 is in the range of 2 to 8:10:8 to 2.

8. The composition of claim 4, further comprising at least one organic solvent selected from the group consisting of N-methylpyrrolidone, m-cresol, chloroform, tetrahydrofuran, dimethyl sulfoxide and dimethylformamide.

9. A flame-retardant plastic material comprising a composition of claim 4.

10. The flame-retardant plastic material of claim 9, further comprising a thermoplastic resin or a thermosetting resin.

11. A flame-retardant plastic material comprising a polyarylate resin of claim 1, and a thermoplastic resin or a thermosetting resin.

12. A flame-retardant plastic material comprising a composition of claim 5.

13. A flame-retardant plastic material comprising a composition of claim 6.

14. A flame-retardant plastic material comprising a composition of claim 7.

15. A flame-retardant plastic material comprising a composition of claim 8.

16. A flame-retardant plastic material comprising a polyarylate resin of claim 2, and a thermoplastic resin or a thermosetting resin.

17. A flame-retardant plastic material comprising a polyarylate resin of claim 3, and a thermoplastic resin or a thermosetting resin.

* * * * *